(12) United States Patent
Basquin et al.

(10) Patent No.: US 12,005,835 B2
(45) Date of Patent: Jun. 11, 2024

(54) PERFORATED VEHICLE INTERIOR TRIM PART

(71) Applicant: Faurecia Innenraum Systeme GmbH, Hagenbach (DE)

(72) Inventors: Guillaume Basquin, Wissembourg (FR); Maxime Musy, Karlsruhe (DE); Axel Ferhet, Karlsruhe (DE); Armand Breton, Ectot les Baons (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 384 days.

(21) Appl. No.: 17/648,064

(22) Filed: Jan. 14, 2022

(65) Prior Publication Data
US 2022/0227292 A1 Jul. 21, 2022

(30) Foreign Application Priority Data
Jan. 15, 2021 (DE) .................... 10 2021 200 379.6

(51) Int. Cl.
*B60Q 3/54* (2017.01)
*B60R 13/02* (2006.01)

(52) U.S. Cl.
CPC .............. *B60Q 3/54* (2017.02); *B60R 13/02* (2013.01); *B60R 2013/0287* (2013.01)

(58) Field of Classification Search
CPC .... B60Q 3/54; B60R 13/02; B60R 2013/0287
See application file for complete search history.

(56) References Cited

U.S. PATENT DOCUMENTS

| | | | |
|---|---|---|---|
| 10,906,476 B2 * | 2/2021 | Preisler | B60R 13/005 |
| 2004/0017687 A1 * | 1/2004 | Misaras | B60Q 3/14 362/555 |
| 2009/0258221 A1 * | 10/2009 | Diehl | G02B 5/0866 428/447 |
| 2010/0261036 A1 * | 10/2010 | Calcagni | G02B 5/0858 428/626 |

(Continued)

FOREIGN PATENT DOCUMENTS

| | | |
|---|---|---|
| CN | 207481800 U * | 6/2018 |
| DE | 19717636 A1 | 11/1998 |
| DE | 102007054348 A1 | 5/2009 |

(Continued)

OTHER PUBLICATIONS

"German Application Serial No. 102021200379.6, Search Report dated Nov. 10, 2021", (Nov. 10, 2021), 8 pgs.

*Primary Examiner* — Lori Lyjak
(74) *Attorney, Agent, or Firm* — Schwegman Lundberg & Woessner, P.A.

(57) ABSTRACT

The present application relates to a vehicle interior trim part. The vehicle interior trim part comprises a decorative layer, which has through-openings. In addition, the vehicle interior trim part comprises a reflective layer, which likewise has through-openings, the inner wall of the through-openings in the reflective layer being reflective. The through-openings in the reflective layer overlap at least in part with the through-openings in the decorative layer, such that a light path is formed at least in part. The reflective layer is at least 1.5 times as thick as the decorative layer in a periphery of the light path.

20 Claims, 3 Drawing Sheets

(56) References Cited

U.S. PATENT DOCUMENTS

2010/0277946 A1* 11/2010 Shallcross ................ B60Q 3/78
362/581
2018/0281701 A1* 10/2018 Preisler ................ B60R 13/005

FOREIGN PATENT DOCUMENTS

| DE | 102008054721 B3 | 4/2010 | | |
|----|----|----|----|----|
| DE | 102009007336 A1 | 9/2010 | | |
| DE | 102015120120 A1 | 5/2017 | | |
| DE | 102016211074 A1 | 12/2017 | | |
| DE | 102016214806 A1 | 2/2018 | | |
| DE | 102016217949 A1 | 3/2018 | | |
| DE | 102016218916 A1 | 3/2018 | | |
| DE | 102016219288 A1 | 4/2018 | | |
| DE | 102016225413 A1 | * | 7/2018 | |
| DE | 102017115304 A1 | 1/2019 | | |
| DE | 102018124893 A1 | 4/2020 | | |
| EP | 2060443 A2 | * | 5/2009 | ............... B60Q 3/14 |
| EP | 2218610 A1 | * | 8/2010 | ............... B60Q 3/14 |

\* cited by examiner

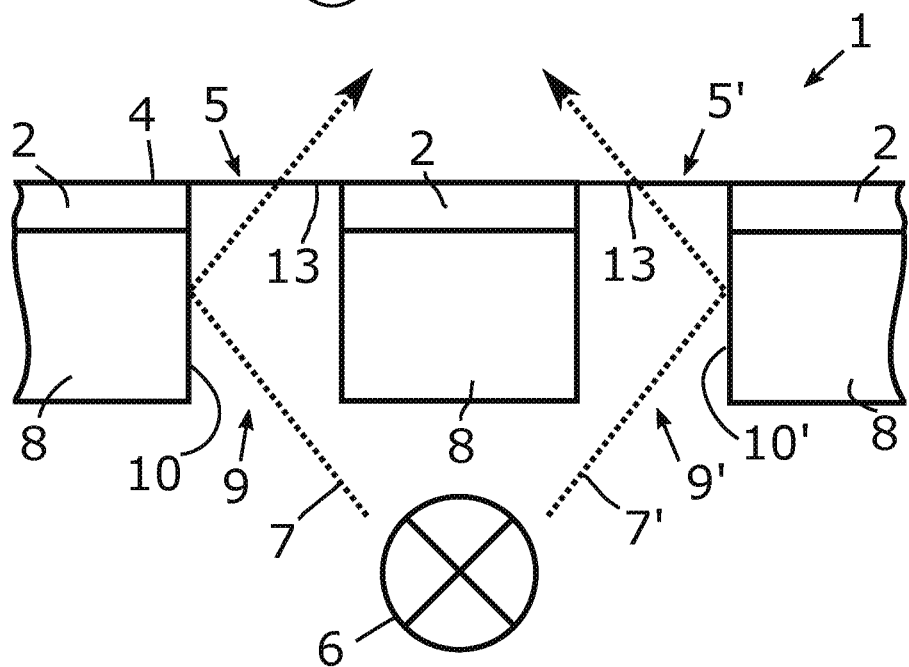

PERFORATED VEHICLE INTERIOR TRIM PART

CLAIM FOR PRIORITY

This application claims the benefit of priority of German Application No. 10 2021 200 379.6, filed Jan. 15, 2021, which is hereby incorporated by reference in its entirety.

TECHNICAL FIELD

The application relates to the field of vehicle interior trim parts that can be illuminated. The application relates to a vehicle interior trim part comprising a decorative layer, which comprises through-openings, and a reflective layer, which likewise comprises through-openings.

BACKGROUND

In general, vehicle interior trim parts may comprise a decorative layer comprising openings, for example a perforated genuine leather layer, on a visible side facing a vehicle interior. As a rule, in a vehicle interior trim part of this kind, a light source is arranged behind the decorative layer such that, when the light source is switched on, the emitted light is emitted through the openings in the decorative layer into the vehicle interior. In this way, atmospheric illumination can be produced in the vehicle interior or a functional optical signal can be generated, for example.

Related techniques are described in DE 10 2016 214 806 A1 and DE 10 2009 007 336 A1, for example.

SUMMARY/OVERVIEW

Owing to interactions between the light and the decorative layer, in known backlit vehicle interior trim parts, a colour of the light emitted into the vehicle interior may, however, depend heavily on the selection of the material used for the decorative layer. In addition, known vehicle interior trim parts may cause the problem of light emitted by the light source only being guided through the openings in the decorative layer to an insufficient extent, which, first of all, may result in the light being emitted into the vehicle interior at a narrow emission angle and, second, may result in a loss of light intensity output into the vehicle interior.

Against the background of the above-mentioned aspects, one problem addressed by the present application is to propose an improved vehicle interior trim part. In particular, the problem addressed by the present application is to propose an aesthetically pleasing vehicle interior trim part which is suitable for efficient backlighting with broad emission characteristics. Owing to broad emission characteristics, light passing through the vehicle interior trim part can also be perceived when viewed from the side. In addition, the problem addressed by the present application is to propose a vehicle interior trim part which allows for emission having good colour fidelity. These problems are solved by a vehicle interior trim part having the features presently disclosed.

The proposed vehicle interior trim part comprises a decorative layer, which comprises through-openings. In addition, the vehicle interior trim part comprises a reflective layer, which likewise comprises through-openings. The through-openings in the reflective layer overlap horizontally at least in part with the through-openings in the decorative layer. The overlap of the through-openings in the decorative layer with the through-openings in the reflective layer is designed such that a light path L (see FIG. 1b, by way of example) is formed at least in regions. A light path of this kind allows light emitted by a light source arranged on a rear side of the vehicle interior trim part to exit from the visible side of the vehicle interior trim part. In some configurations, the through-openings in the decorative layer and the through-openings in the reflective layer are formed such that the inner walls of the decorative layer and the reflective layer are flush with one another. In this way, increased luminous efficiency can be obtained. In general, the reflective layer is configured to reflect light from the reflective layer, in particular from an inner wall of the through-openings in the reflective layer, in particular the inner wall, before passing through the through-openings in the decorative layer.

For attractive light emission having broad emission characteristics, it is advantageous to design the reflective layer to be at least 1.5 times as thick as the decorative layer in a periphery of the light path. Preferably, the reflective layer is intended to be at least twice as thick as the decorative layer.

The proposed vehicle interior trim part is suitable for upgrading existing or known backlighting systems in a vehicle interior which provide a light source. It may in particular be provided that the proposed vehicle interior trim part itself comprises a light source. The light source may be arranged, in particular may be arranged behind the reflective layer and/or the decorative layer, such that at least some of the light emitted by the light source passes through the through-openings in the reflective layer and the through-openings in the decorative layer. The light emitted by the light source is generally light in the visible spectral range. In general, the reflective layer is arranged between the light source and the decorative layer. In a preferred embodiment, the decorative layer and the reflective layer adjoin one another in regions, for example in the periphery of the light path, or completely.

Because the reflective layer is configured to reflect the light from the reflective layer and in particular from the inner wall of the reflective layer, the proposed vehicle interior trim part achieves improved light guidance from the light source into the vehicle interior with comparatively broad emission characteristics. This is particularly advantageous since light emitted by the light source is not always aligned with the through-openings in the decorative layer in an ideal manner. The proposed vehicle interior trim part thus prevents an excessively large proportion of the light passing through the through-openings being dimmed by interaction with an inner wall of the through-opening. In addition, owing to the reflective layer, a light colour of the light emitted into the vehicle interior is not dependent, or is only dependent to a limited extent, on the selection of the decorative layer.

Therefore, the design of vehicle interior trim parts for backlighting that have colour fidelity and are aesthetically pleasing can be simplified. In particular, the proposed vehicle interior trim part can prevent undesired colour shifts. For example, the proposed vehicle interior trim part makes it possible for white light to also enter the vehicle interior in the case of backlighting with white light.

It may be provided that the reflective layer is configured to reflect the light in a diffuse manner. In this way, the proposed vehicle interior trim part can achieve even further improved light guidance through the openings and broader emission characteristics. In some embodiments, a reflectance of the reflective layer, in particular on the inner wall of the second through-openings, in the visible spectral range is at least 0.25, in particular at least 0.5, in particular at least 0.75. The reflective layer, for example on the inner wall of the second through-openings, typically has a higher reflection coefficient than the decorative layer, for example in the region of the first through-openings.

It may be provided that the reflective layer is white or grey. As a result, a low level of colour distortion is achieved when the light is reflected from the reflective layer. Therefore, the colour fidelity of the backlit vehicle interior trim part can be further improved. For this purpose, the reflective layer may for example have pigmentation, in particular white or grey pigmentation. In particular, the reflective layer may consist of bleached leather.

In some configurations, the reflective layer has a thickness of at least 0.2 mm. Preferably, the reflective layer has a thickness of at most 7 mm. In some preferred embodiments, the reflective layer has a thickness of at least 0.6 mm and at most 3 mm. In general, the reflective layer is flexible, such that it can be stretched over an armrest, for example. In other configurations, however, the reflective layer may also be rigid.

The reflective layer may be made of synthetic and/or natural materials, such as wood, leather, woven fabric, non-woven fabrics and composite materials, in particular bleached and/or white leather. In some configurations, the reflective layer is materially bonded to a rear side of the decorative layer. In this way, good mechanical stability of the vehicle interior trim part together with advantageous haptics can be obtained. The reflective layer and the decorative layer may comprise differently coloured layers and/or may consist of the same material. The reflective layer and the decorative layer may be different layers of a genuine leather skin, for example.

A front side of the decorative layer generally forms a visible side of the vehicle interior trim part facing the vehicle interior. The reflective layer is typically arranged behind the decorative layer, in particular when viewed from the vehicle interior. In typical configurations, the reflective layer is arranged between the decorative layer and the light source. The decorative layer is typically opaque. It may be provided that the decorative layer is a leather layer, in particular an artificial leather layer or a genuine leather layer. In some embodiments, the decorative layer may be coloured. To do this, the decorative layer may be pigmented and/or coated with a coloured layer. The decorative layer may consist of a coloured coating, which provides the character of the outer surface, including a grain structure.

The decorative layer typically has a thickness of between 0.01 mm and 1 mm, in particular between 0.1 mm and 0.7 mm.

Preferably, a composite layer made up of the decorative layer and the reflective layer is at most 10 times as thick as the longest extension of a cross section of the through-openings perpendicular to the light path. In one embodiment, a composite layer made up of the decorative layer and the reflective layer may be at least as thick as the longest extension of a cross section of the through-openings perpendicular to the light path.

In a preferred embodiment, in which the layer thickness Th2 (see Th2 in FIG. 1b, by way of example) of the reflective layer is at least 1.5 times as thick, in particular at least twice as thick, as a layer thickness Th1 (see Th1 in FIG. 1b, by way of example) of the decorative layer, i.e. Th2>1.5×Th1, at least in a peripheral region of the light path L (see L in FIG. 1b, by way of example), the composite layer made up of the decorative layer and the reflective layer is intended to be at most 10 times as thick as an extension d of a cross section of the through-openings (see d in FIG. 1b, by way of example).

In this way, high luminous efficiency can be achieved by reducing the beams impinging on the decorative layer. In particular, complex methods for producing high luminous efficiency, such as light guidance by means of filled through-holes, and optical systems such as lenses and/or conical through-holes, can thus be dispensed with. For high luminous efficiency, the layer thickness of the decorative layer is intended to be selected to be as thin as possible. Despite the low layer thickness of the decorative layer, the outer surface of the decorative layer is typically intended to comply with characteristic outer-surface specifications such as opacity, haptics and mechanical resistance to abrasion and scratches, for example. In some embodiments, the reflective layer and the decorative layer have an approximately homogeneous layer thickness. In this embodiment, the layer thickness of the reflective layer is typically at least 1.5 times as thick as the decorative layer over the entire surface.

For vehicle interior trim parts made of leather, layer thicknesses of the decorative layer are generally in the range of from 0.01 mm to 1 mm. In some embodiments, the reflective layer forms a dimensionally stable carrier layer for the decorative layer. The reflective layer may be axially and/or flexurally rigid, depending on the selected material. It may be provided that the decorative layer and the reflective layer form a layer composite at least in part. The reflective layer and the decorative layer may consist of identical or different materials. The layer composite is typically between 0.5 mm and 2.5 mm thick.

The through-openings in the decorative layer may be formed by a perforation. In some configurations, a thickness of the decorative layer is at least 0.01 mm and/or at most 2 mm. In order to achieve high light extraction of the light emitted by the light source into the vehicle interior, the ratio between a thickness of the layer composite, which consists of the layer thickness Th1 (see Th1 in FIG. 1b, by way of example) of the decorative layer and the layer thickness Th2 (see Th2 in FIG. 1b, by way of example) of the reflective layer, and the longest extension d (see d in FIG. 1b, by way of example) of a cross section of the through-openings is preferably less than 10, i.e. (Th1+Th2)/d<10. For through-holes that are cylindrical and conical, for example, the longest extension d of the cross section therefore relates to the diameter of the base area. For through-holes that are square and pyramidal, the longest extension d of the cross section therefore relates to the length of the diagonal of the base area.

The through-openings in the reflective layer generally have a diameter and/or shape that corresponds to the diameter or shape of the through-openings in the decorative layer. In other configurations, a diameter of the through-openings in the reflective layer is at least as large as a diameter of the through-openings in the decorative layer. In most configurations, the reflective layer is also designed such that it is not visible from the vehicle interior.

In some configurations, the vehicle interior trim part comprises at least ten, in particular at least twenty five, through-openings in the decorative layer or reflective layer. In some configurations, a diameter or width of the through-openings in the decorative layer and/or the through-openings in the reflective layer is at least 0.01 mm, in particular at least 0.1 mm, in order to ensure a sufficiently high transmitted light intensity. For aesthetically pleasing light patterns, the diameter or width of the through-openings in the decorative layer and/or the through-openings in the reflective layer is at most 5 mm, in particular at most 2.5 mm. The through-openings in the decorative layer and/or the through-openings in the reflective layer may for example be round or may have a different geometric shape and may be designed as checked patterns or line patterns, for example. In a preferred embodiment, the through-openings are circular, with a diameter of 1 mm.

The through-openings in the decorative layer and/or the through-openings in the reflective layer may be homogeneously distributed or may be distributed over the vehicle interior trim part in a pattern or a plurality of patterns.

Typically there are between 10 and 250 through-openings in the decorative layer and/or the reflective layer over an area of 10 cm$^2$ of the vehicle interior trim part. When the through-openings are homogeneously distributed, the minimum distance between the through-openings may for example be between 2 mm and 10 mm.

The light source may for example consist of or comprise one or more light-emitting diodes. The light source may also be a light-emitting textile layer arranged behind the reflective layer. Further embodiments may include an optical waveguide between the light source and the through-openings, for example made of transparent or translucent plastics material.

BRIEF DESCRIPTION OF THE FIGURES

Embodiments will be described in the following with reference to the drawings, in which:

FIG. 4 is a cross-sectional view of a vehicle interior trim part according to another configuration.

DETAILED DESCRIPTION

Figure 1A:
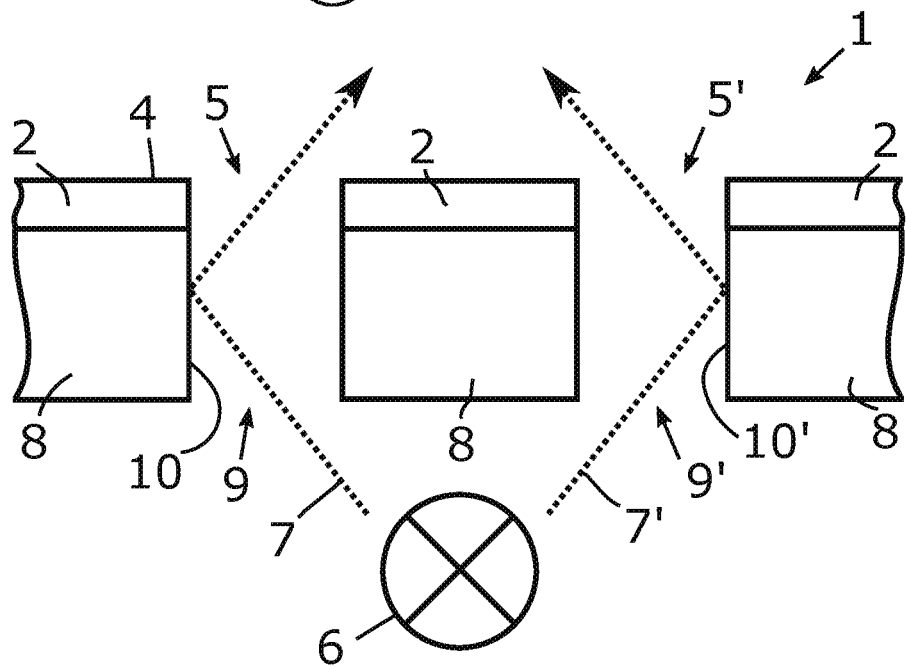
FIG. 1a is a cross-sectional view of a vehicle interior trim part comprising a light source.

FIG. 1a is a cross section of a vehicle interior trim part 1. The vehicle interior trim part 1 comprises a decorative layer 2 and is thus arranged in a vehicle interior 3 such that a front side of the decorative layer 2 forms a visible side 4 of the vehicle interior trim part 1. The decorative layer 2 may for example be an artificial leather layer, a genuine leather layer or a coloured coating. The decorative layer 2 comprises a plurality of through-openings 5, 5', for example round holes having a diameter of 1.2 mm, for example, or linear openings having a corresponding width. The vehicle interior trim part 1 also comprises a light source 6, which is arranged behind the decorative layer 2 and may for example be configured as one or more light-emitting diodes or as a light-emitting textile. When the light source 6 is switched on, light (two beams are shown by way of example and are denoted by reference signs 7, 7') passes through the through-openings 5, 5' in the decorative layer 2 into the vehicle interior 3. In this way, the vehicle interior trim part 1 constitutes a backlit trim element and may form a part of a dashboard or door panel, for example. By means of the backlighting, atmospheric illumination of the vehicle interior 3 can be produced, for example. In some configurations, the vehicle interior trim part 1 may also be configured to produce functional illumination. For example, if there is a hazard approaching on the road ahead, a red-lit strip or red-lit pattern can be produced along an inner door panel. Functional displays, such as information symbols (icons), may also be produced by the backlit through-openings 5, 5'.

For improved light guidance into the vehicle interior 3 and for improved colour fidelity and emission characteristics of the light emitted into the vehicle interior 3, the decorative layer 2 comprises, on its side facing away from the vehicle interior, a reflective layer 8, which may be made of bleached and/or white leather, for example. The reflective layer 8 forms through-openings 9, 9' that are flush with the through-openings 5, 5' in the decorative layer 2 and is not visible when viewed from the vehicle interior 3.

Light emitted by the light source 6 is reflected into the vehicle interior 3 in a diffuse manner from the inner walls 10, 10' of the through-openings 9, 9' in the reflective layer 8.

In some configurations, a translucent air gap is arranged between the light source 6 and the reflective layer 8. For example, the light source 6 may be arranged in a plastics box on a carrier (not shown) of the vehicle interior trim part 1, the plastics box being open on one side and being covered by the decorative layer 2 together with the reflective layer 8.

Figure 1B:
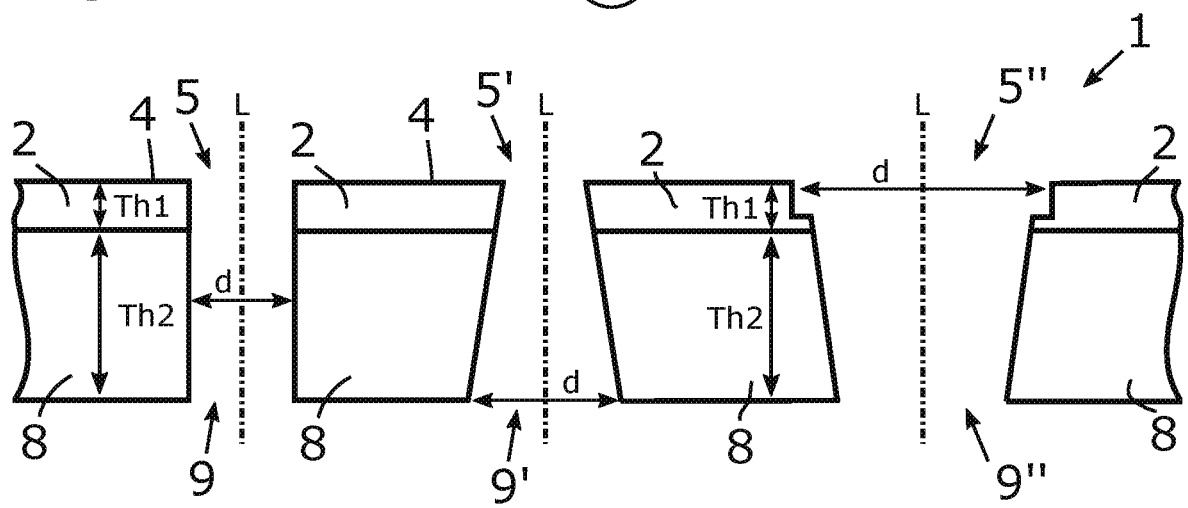
FIG. 1b is a cross-sectional view of a vehicle interior trim part according to another configuration.

FIG. 1b shows alternative embodiments of the through-holes 5, 5', 5", 9, 9', 9". For high luminous efficiency, a composite layer thickness made up of the layer thickness Th1 of the decorative layer 2 and the layer thickness Th2 of the reflective layer 8 is intended to be at most 10 times thicker than the longest extension d of the cross section of the through-openings perpendicular to the light path L (generally coinciding with a parallel plane of the decorative-layer plane), i.e. Th1+Th2<10×d.

Figure 2:
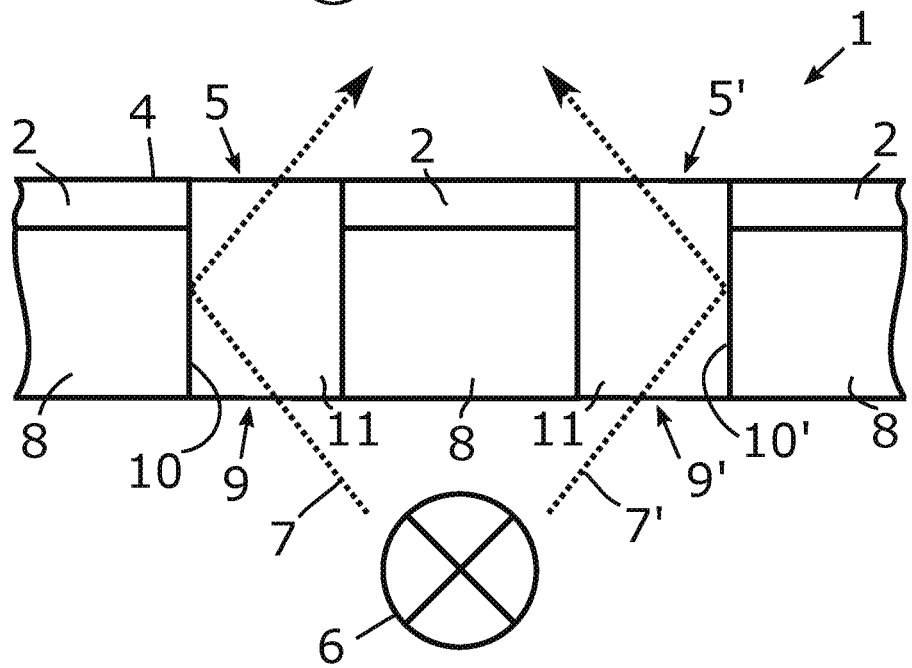
FIG. 2 is a cross-sectional view of a vehicle interior trim part according to another configuration.

FIG. 2 shows that the through-openings 5, 5', 9, 9' can be filled with a translucent and, for example, clear or milky, generally plastics-material-containing, filler material 11. The filler material 11 may for example be produced together with an optical waveguide (not shown here) by laminating behind the decorative layer 2 and/or the reflective layer 8, the filler material 11 penetrating into the through-openings 5, 5', 9, 9' and forming the optical waveguide covering a rear side of the reflective layer 8. The optical waveguide and/or the filler material 11 may be made of TPU or PC. The optical waveguide and/or the filler material 11 may be coloured, the optical waveguide and/or the filler material 11 not being the same colour all over. For example, the filler material 11 may be a different colour in different through-openings 5, 5', such that the perforation can produce a coloured pattern.

Figure 3:
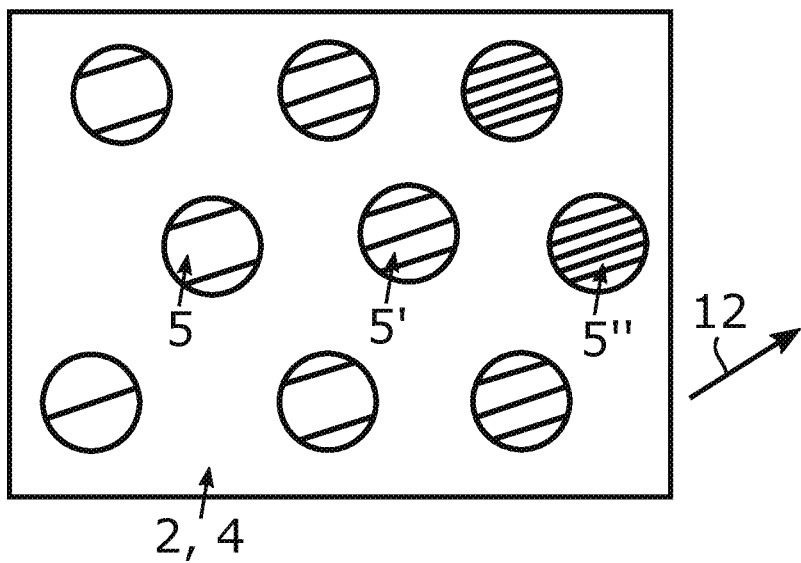
FIG. 3 is a plan view of a vehicle interior trim part according to various configurations.

FIG. 3 is a plan view of the vehicle interior trim part according to FIGS. 1, 2 and 4 when viewed from the vehicle interior 3. In this embodiment, the reflective layer 8 is the same colour, for example grey, in all regions. The reflective layer 8, however, has a different brightness in different regions due to different bleaching, and specifically such that a brightness of the reflective layer 8 increases in a direction denoted by reference sign 12 here. In this way, a brightness gradient of the light emitted into the vehicle interior 3 is produced, as illustrated by the figure: The differing shading in the different through-openings 5, 5', 5" in the decorative layer 2 illustrates the differences in brightness of the light guided into the vehicle interior 3 produced by the different pigmentation of the reflective layer 8. Despite the through-openings 5, 5', 5" having the same diameter, of the through-openings 5, 5', 5" shown, the highest light intensity enters the vehicle interior 3 through the through-opening having the reference sign 5" and the lowest light intensity enters said vehicle interior through the through-opening having the reference sign 5. Additionally or alternatively, the through-openings 5, 5', 5" may be filled with a coloured, translucent material, and in particular different through-openings 5, 5', 5" may be different colours.

FIG. 4 shows that the through-openings 5, 5', can be covered with a translucent and, for example, clear or milky covering material 13. The covering material 13 may for example be applied over the entire surface by laminating the decorative layer 2. Alternatively, the covering material 13 may only be applied in a periphery of the through-openings 5, 5'. The covering material 13 is intended to cover the through-openings 5, 5' at least in part. The covering material 13 may be coloured, it not having to be the same colour all over. For example, the covering material 13 may be a different colour in different through-openings 5, 5', such that the perforation can produce a coloured pattern. In another embodiment, the covering material 13 is perforated in the region of the through-openings 5, 5' and acts as a transparent protective layer for the surface of the decorative layer.

What is claimed is:

1. A vehicle interior trim part, comprising:
a decorative layer, the decorative layer including one or more first through-openings; and
a reflective layer, the reflective layer including one or more second through-openings;
wherein an inner wall of the second through-openings are reflective, wherein the one or more first through-openings and the one or more second through-openings overlap at least in a region for forming a light path, and wherein the reflective layer is at least 1.5 times as thick as the decorative layer in a periphery of the light path.

2. The vehicle interior trim part according to claim 1, wherein a composite layer made up of the decorative layer and the reflective layer is at least the same thickness and at most 10 times as thick as a longest extension of a cross section of at least one of the one or more first through-openings or the one or more second through-openings perpendicular to the light path.

3. The vehicle interior trim part according to claim 1, wherein the reflective layer is at least twice as thick as the decorative layer in the periphery of the light path.

4. The vehicle interior trim part according to claim 1, wherein a reflectance of the reflective layer on the inner wall of the one or more second through-openings in the visible spectral range is at least 0.25.

5. The vehicle interior trim part according to claim 1, wherein the reflective layer is arranged behind the decorative layer.

6. The vehicle interior trim part according to claim 1, wherein the reflective layer is configured to reflect light from the inner wall before passing through the one or more first through-openings in the decorative layer.

7. The vehicle interior trim part according to claim 1, wherein the reflective layer has a higher reflection coefficient than the decorative layer.

8. The vehicle interior trim part according to claim 1, wherein the decorative layer is a leather layer.

9. The vehicle interior trim part according to claim 1, wherein the decorative layer and the reflective layer at least partially abut one another.

10. The vehicle interior trim part according to claim 1, wherein at least one of the one or more first through-openings in the decorative layer or the one or more second through-openings in the reflective layer are filled.

11. The vehicle interior trim part according to claim 1, wherein the decorative layer has a thickness of between 0.01 mm and 1 mm.

12. The vehicle interior trim part according to claim 1, wherein the reflective layer is a bleached white or grey leather.

13. The vehicle interior trim part according to claim 1, wherein an outer surface of the decorative layer is coloured.

14. The vehicle interior trim part according to claim 1, wherein the decorative layer is opaque.

15. The vehicle interior trim part according to claim 1, wherein a reflectance of the reflective layer on the inner wall of the second through-openings in the visible spectral range is at least 0.5.

16. The vehicle interior trim part according to claim 1, wherein at least one of the one or more first through-openings in the decorative layer or the one or more second through-openings in the reflective layer are unfilled.

17. A vehicle interior trim part, comprising:
a decorative layer, the decorative layer including one or more first through-openings;
a reflective layer, the reflective layer including one or more second through-openings; and
a composite layer made up of the decorative layer and the reflective layer;
wherein an inner wall of the second through-openings are reflective, wherein the one or more first through-openings and the one or more second through-openings overlap at least in a region for forming a light path, and wherein the reflective layer is at least 1.5 times as thick as the decorative layer in a periphery of the light path, wherein the composite layer has a thickness at least as thick and at most ten times as thick as a longest extension of a cross section of at least one of the one or more first through-openings or the one or more second through-openings perpendicular to the light path.

18. The vehicle interior trim part according to claim 17, wherein the decorative layer has a thickness of between 0.1 mm and 0.7 mm.

19. A vehicle interior trim part, comprising:
a decorative layer, the decorative layer including one or more first through-openings; and
a reflective layer, the reflective layer including one or more second through-openings;
wherein an inner wall of the second through-openings are reflective, wherein the one or more first through-openings and the one or more second through-openings overlap at least in a region for forming a light path, wherein the reflective layer is at least 1.5 times as thick as the decorative layer in a periphery of the light path, wherein the reflective layer is arranged behind the decorative layer, wherein the reflective layer is configured to reflect light from the inner wall before passing through the one or more first through-openings in the decorative layer, wherein the reflective layer has a higher reflection coefficient than the decorative layer, and wherein the decorative layer has a thickness of between 0.01 mm and 1 mm.

20. The vehicle trim part according to claim 19, wherein the decorative layer and the reflective layer at least partially abut one another, wherein the decorative layer is a leather layer, and wherein a reflectance of the reflective layer on the inner wall of the one or more second through-openings in the visible spectral range is at least 0.5.

* * * * *